(12) United States Patent
Fichet et al.

(10) Patent No.: US 8,610,087 B2
(45) Date of Patent: Dec. 17, 2013

(54) METHOD FOR MEASURING TRITIUM OR OTHER RADIATION FOR DISMANTLING

(75) Inventors: Pascal Fichet, Poissy (FR); Florence Goutelard, Marcoussis (FR); Fannie Bresson, Antony (FR); Hubert Lelache, Orsay (FR)

(73) Assignee: Commissariat à l'Energie Atomique et aux Energies Alternatives (FR)

( * ) Notice: Subject to any disclaimer, the term of this patent is extended or adjusted under 35 U.S.C. 154(b) by 0 days.

(21) Appl. No.: 13/821,369

(22) PCT Filed: Sep. 9, 2011

(86) PCT No.: PCT/EP2011/065673
§ 371 (c)(1),
(2), (4) Date: Mar. 7, 2013

(87) PCT Pub. No.: WO2012/032168
PCT Pub. Date: Mar. 15, 2012

(65) Prior Publication Data
US 2013/0168575 A1    Jul. 4, 2013

(30) Foreign Application Priority Data
Sep. 10, 2010 (FR) ...................... 10 57230

(51) Int. Cl.
*G01T 1/04* (2006.01)
(52) U.S. Cl.
USPC ...................................... 250/473.1

(58) Field of Classification Search
USPC ........................................ 250/473.1
See application file for complete search history.

(56) References Cited

U.S. PATENT DOCUMENTS

| 4,931,643 | A | * | 6/1990 | Amtmann | ...................... 250/583 |
| 5,063,583 | A | * | 11/1991 | Galkin | ........................ 378/207 |
| 2005/0236582 | A1 | * | 10/2005 | Nakatsu | ................... 250/484.4 |

FOREIGN PATENT DOCUMENTS

| FR | 2128055 A1 | 10/1972 |
| GB | 781139 A | 8/1957 |
| JP | 3041386 | 2/1991 |

OTHER PUBLICATIONS

International Preliminary Examination Report for Application No. PCT/EP2011/065673 dated Nov. 30, 2012.
Coe et al., "An evaluation of X-ray films suitable for autoradiography using <14>C beta-radiation", International Journal of Applied Radiation and Isotopes, Pergamon Press. New York. NY, US, vol. 33, No. 7, Jul. 1, 1982, pp. 575-582, XP024626139.

* cited by examiner

*Primary Examiner* — David Porta
*Assistant Examiner* — Kenneth J Malkowski
(74) *Attorney, Agent, or Firm* — Lerner, David, Littenberg, Krumholz & Mentlik, LLP

(57) ABSTRACT

The invention relates to a kit for detecting β-radiation on a solid surface in a manner that is not destructive to the solid surface, said kit including at least two films that are sensitive to at least two different types of radiation, including the β-type.

10 Claims, 3 Drawing Sheets

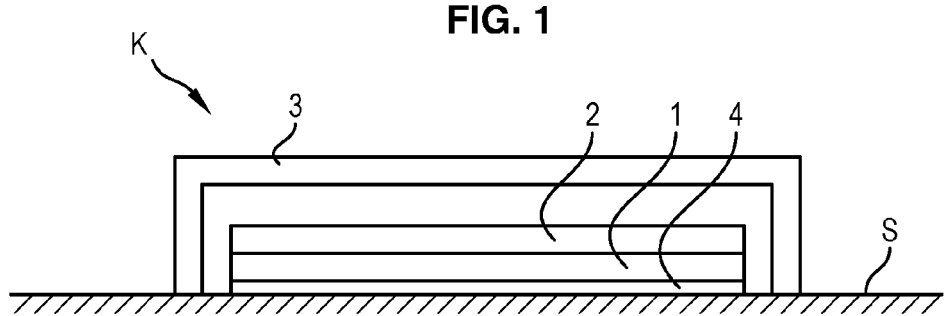
FIG. 1
FIG. 2a
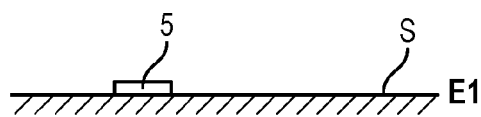
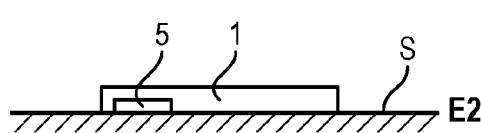
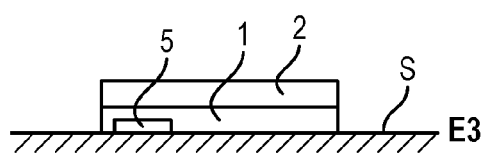
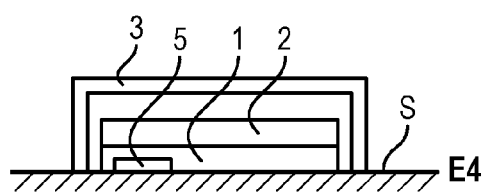
FIG. 2b
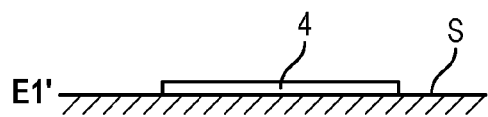
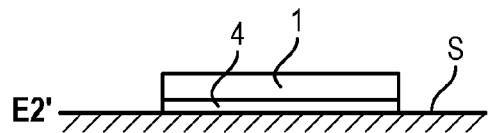
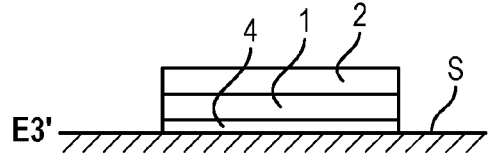

METHOD FOR MEASURING TRITIUM OR OTHER RADIATION FOR DISMANTLING

CROSS REFERENCE TO RELATED APPLICATIONS

The present application is a national phase entry under 35 U.S.C. §371 of International Application No. PCT/EP2011/065673, filed Sep. 9, 2011, published in French, which claims priority from French Patent Application No. 1057230, filed Sep. 10, 2010, the disclosures of which are incorporated by reference herein.

FIELD OF THE INVENTION

The invention relates to the field of radioactive radiations detection. More particularly, the invention relates to $\beta^-$ radiation detection on solid surfaces. Pure $\beta^-$ emitters are radionuclides the $\beta^-$ radiation of which is not accompanied by X or $\gamma$ radiation.

TECHNOLOGICAL BACKGROUND

It is important to be able to detect radioactive radiations on a nuclear site, in particular before dismantling thereof, in order to know the risks that the persons present on the site are incurring and to provide them with suitable protection.

Certain radiations are easier to detect than others. For these radiations, such as the $\gamma$ (gamma) and X types, suitable tools are available today for knowing the intensity of these radiations in a localised manner.

However, other radiations are more difficult to detect since these are too weak, such as those of the $\beta^-$ type. $\beta^-$ radiations are emitted by atom nuclei, comprising neutrons and protons, presenting an excess of neutrons. At constant pressure, a neutron of the nucleus may transform into a proton. This is accompanied by the emission of an electron, which is a $\beta^-$ particle, and an antineutrino. $\beta^-$ radiations are termed moderately penetrating; a sheet of aluminium a few millimetres thick suffices to stop $\beta^-$ radiations, unlike $\gamma$ and X radiations, which are termed highly penetrating.

In nuclear sites, $\beta^-$ radiations are due mainly to tritium $^3H$, a radioactive isotope of hydrogen $^1H$. Before proceeding with the dismantling of the site, it is wished to identify the areas emitting $\beta^-$ radiations, which reveals the presence of tritium $^3H$ that it is necessary to decontaminate.

At the present time, in order to detect $\beta^-$ radiations due to tritium $^3H$ on a solid surface, samplings are carried out, which destroys the solid surface being studied.

For example, in the document "Calculations and measurements of the activation induced in the protective concretes of a high-energy ion accelerator", in Radioprotection 2000, volume 35, n° 3, pages 311 to 334, the dismantling of the Saturn II synchrotron is described, in operation from 1979 to 1997 at Saclay, France. Prior to the measurement, core sampling is carried out in the concrete of the synchrotron structure, and then the core taken is sampled with diamond. The tritium $^3H$ is then measured on these cores by counting with a liquid scintillator. The sample preparation method is not known from this document.

One drawback of the method used in this article is the need to destroy the solid surface on which it is wished to carry out the measurements of tritium $^3H$. Another drawback is the very localised measurement of tritium $^3H$ and, if a measurement at another place is required, another core sampling is necessary.

A device and method for measuring tritium $^3H$ in a non-destructive manner are described in the document JP 3-041 386. The device comprises a connection head composed of one end of an aspiration tube, heating elements and fixing suckers for fixing to a solid surface. The aspiration tube is connected to a cold trap, itself connected to an aspiration pump provided with a flow meter.

The method used is as follows: the connection head is placed on the solid surface, in this case concrete. The fixing suckers hold the connection head in place. The heating elements heat the concrete 200° C. on the part covered by the connection head, thus evaporating the water present in the concrete. The pump sucks the water vapour escaping from the concrete. When the water vapour reaches the cold trap, it cools until it condenses into liquid water, which will be used subsequently for measuring the tritium $^3H$ contained in this water.

One drawback of the device and method of this document is that discretising the solid surface is only possible in fractions of the size of the connection head. However, the size of the connection head must be sufficiently large to make it possible to aspirate a sufficient quantity of water in vapour form especially since the concrete does not contain an enormous amount thereof. This technique also assumes that the tritium $^3H$ is labile whereas it may very well be strongly bonded to the concrete.

Another drawback is the need to transport potentially radioactive liquid samples.

Yet another drawback is the difficulty of robotising the placing of the connection head, which has a specific form.

PRESENTATION

One objective of the invention is to overcome at least one drawback of the prior art described given above by way of examples.

To this aim, the invention provides a kit for detecting $\beta^-$ radiations on a solid surface in a way that is not destructive to the solid surface, comprising at least two films sensitive to at least two distinct type of radiation, including the $\beta^-$ type.

One advantage of this kit is the simplicity of use thereof. In addition, the use of simple films allows robotised placing, which avoids a person entering the enclosure to be dismantled to carry out sampling operations.

Another advantage is the possibility of having a detection in two dimensions of the solid surface.

Other optional and non-limitative features are:
   the kit also comprises a protection for protecting the films from the radiation surrounding the solid surface;
   the protection is a sheet of polymer film;
   the protection is a black fabric;
   the protection is a cover made from a material that is not penetrated by the radiation to which the films are sensitive;
   the cover is made from lead;
   a calibrated scale for quantifying the $\beta^-$ radiations.

The invention also provides a method of using the kit described above comprising the following steps:
   placing a first film on the solid surface;
   placing a second film on the first film.

Other optional and non-limitative features of the method are:
   it also comprises the step of covering the two films with the protection;
   it also comprises the step of developing the films by laser by means of a suitable apparatus.

PRESENTATION OF THE DRAWINGS

Other objectives, features and advantages will emerge from reading the detailed description that follows, with reference to the drawings given by way of illustration and non-limitatively, among which:

FIG. 1 shows schematically a kit for the detection of $\beta^-$ radiation in place on a solid surface;

FIG. 2a illustrates the steps of the method of using the kit of FIG. 1 when a sampling scale is used;

FIG. 2b illustrates the steps of the method of using the kit of FIG. 1 when a separator is used;

FIG. 4b is a reproduction of a developed film that has been placed on top of the film carrying the marking of the sampling scale of FIG. 4a.

DETAILED DESCRIPTION

$\beta^-$ Radiation Detection Kit

Figure 3A:
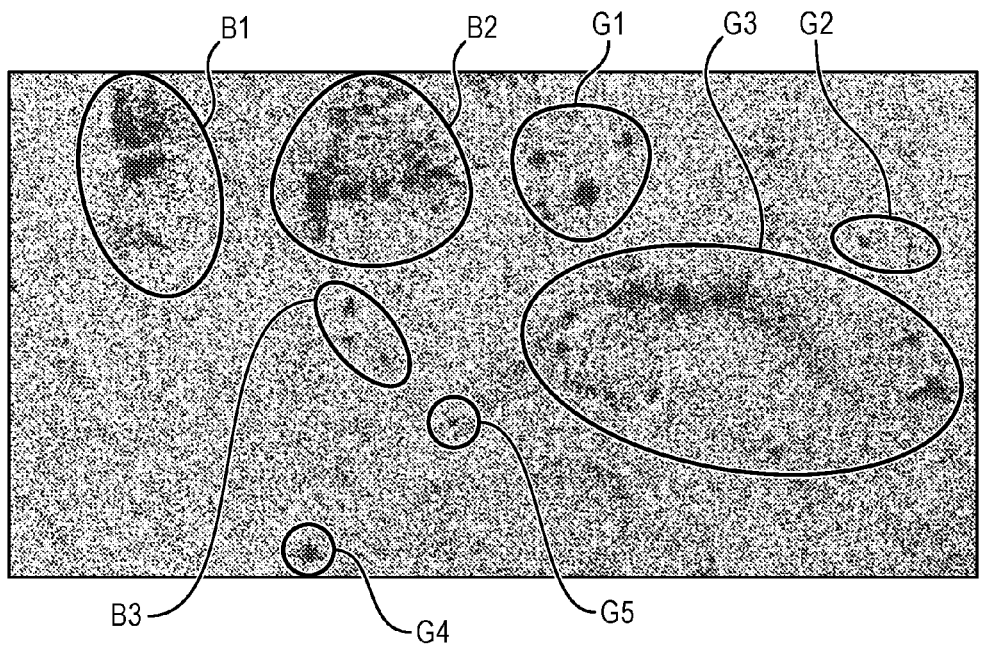
FIG. 3a is a reproduction of a first film developed by laser after exposure to the radiations from the solid surface, the film being the one that is closer to the solid surface.

With reference to FIG. 1, a $\beta^-$ radiation detection kit is described below. This kit K makes it possible to detect, or even measure, $\beta^-$ radiation in a way that is not destructive to the solid surface S.

The kit K comprises at least two films 1, 2 sensitive to at least two distinct types of radiation, including the $\beta^-$ type.

For example, the two films 1, 2 may be identical and sensitive to $\beta^-$, $\gamma$, X or even also $\alpha$ radiations.

In another example, the two films 1, 2 are different, one is sensitive to $\beta^-$ radiations and the other to $\gamma$ radiations, or even also X but not to $\beta^-$ radiations.

The number of films in the kit K varies according to the type of radiations that it is wished to detect and/or measure.

The films 1, 2 are advantageously made from polymer covered with a layer of phosphorus. These films typically have a thickness of 1 mm. These films 1, 2, once exposed to the $\beta^-$, $\gamma$, X or $\alpha$ radiations, can easily be reused by exposing them to an intense homogeneous white light but without UV.

The kit K may also comprise a protection 3 for protecting the films 1, 2 from the other radiations surrounding the solid surface S and in particular to the radiation of daylight, which could wipe the films. The protection 3 may be a thin sheet of polymer of approximately 450 µg/cm², a black fabric or a cover made from a material that is not penetrated by the radiations to which the films 1, 2 are sensitive. In the case where the protection 3 is a cover, this may be made from lead.

The $\beta^-$ radiations are emitted by the nuclei of various atoms, for example tritium $^3H$ and carbon 14 $^{14}C$. In the case where the concern is solely with tritium $^3H$, it is necessary to detect only the $\beta^-$ radiations of tritium $^3H$. The $\beta^-$ radiations emitted by carbon 14 ($^{14}C$) are more penetrating that the $\beta^-$ radiations emitted by tritium $^3H$. However, the $\beta^-$ radiations from carbon 14 $^{14}C$ may be separated from the $\beta^-$ radiations from tritium $^3H$ using a separator 4 consisting for example of a sheet of paper between the solid surface S and the first film 1. In this case only carbon 14 $^{14}C$ is seen on the development of the film. The tritium $^3H$ is then observed by the difference between two recordings, one with the separator and the other without the separator.

The kit K may also comprise a sampling scale 5 for quantifying the tritium $^3H$. The sampling scale 5 makes it possible to quantify the $\beta^-$ radiations and therefore to quantify tritium $^3H$.

The sampling scale 5 is a series of diverse matrices (for example polymer, concrete, metals, etc.) comprising tritium $^3H$ in different concentrations, for example from 1 kBq/g to around 10 kBq/g, thus forming a set of standards. The sampling scale 5 is to be placed on the solid surface S and under the films 1, 2. The matrices are chosen so as to obtain a good contrast on the film 1 (the size of the matrix in the example in FIG. 4a corresponds to a cylinder with a diameter of approximately 1 cm and a thickness of approximately 1 mm).

The sampling scale impresses the films 1, 2 differently according to the exposure time. In the case of quantitative analysis, it is necessary for the films 1, 2 to be exposed for the same period of time on the scale and the materials to be analysed,

Method of Use of the Kit

With reference to FIGS. 2a and 2b, a description is given below of a method of using the kit K described above.

First of all, a first film 1 is placed E2, E2' on the solid surface S directly in contact therewith. This first film 1 will be marked by the $\beta^-$, $\gamma$, X and a radiations and stop some of them.

Next, a second film 2 is placed E3, E3' on the first film 1 directly in contact therewith. Some radiations have been stopped by the first film 1 and therefore the second film 2 will be marked only by the radiations that have passed through the first film 1 and therefore that are penetrating.

Other films can also be placed on each occasion by stacking on the previous stack and in contact therewith. The number of films to be used depends on the $\beta^-$ radiations that it is wished to detect and/or measure. This is because not all $\beta^-$ radiations penetrate in a material in the same way and over the same distance.

$\beta^-$ radiations are not very penetrating; in the majority of cases they are stopped by the first film 1 and therefore mark only the latter. However, in some cases, $\beta^-$ radiations may be more penetrating. It is therefore necessary to use at least one additional film. The most penetrating radiations such as $\gamma$ or X mark all the films.

It is possible to verify whether the radiations detected on the second film 2 or, if several films are used, the last on the top of the stack, are radiations other than $\beta^-$ by using a suitable electronic detector. If the detector indicates that the radiations that mark the second film 2 or, in the case where several films have been used, the last film on the top of the stack, are $\gamma$ or X radiations for example, then there is no need to add another film. Otherwise, if the detector indicates that there exists a point on the second film 2 or, where applicable, the last film on the top of the stack, which is not marked by $\gamma$ or X radiations, for example, then it will be necessary to add an additional film since the mark left is probably due to more penetrating $\beta^-$ radiations.

In order to avoid as much as possible the impression and/or obliteration of the films by stray light coming from the environment around the solid surface S, the two films 1, 2 or the stack of films can be covered E4, E4' with a protection 3, for example a cover.

The films 1, 2 are left exposed to the radiations from the solid surface S for a given time, for example two weeks in the case of low contamination with tritium $^3H$. The time is determined experimentally in order to optimise the signal to background ratio and obtain the best contrast on the film.

At the end of the exposure time, the films 1, 2 are collected and exposed by laser by means of suitable apparatus.

When the films 1, 2 are collected and optionally transported, it will be necessary to take care not to leave them exposed to ambient stray light so as to prevent deletion of the data recorded by the films 1, 2.

Where a separator 4 is used, FIG. 2b, it is placed E1' before the first film 1 directly in contact with the solid surface S. In this case, the first film 1 is then in contact with the separator 4.

If a sampling scale 5 in the form of a series of matrices is used (FIG. 2a) comprising tritium $^3$H in different concentrations, it must be placed E1 under the first film 1 or, where applicable, under the separator 4.

One advantage of this method is the simplicity of the successive operations to be put in place and which are summarised in the superimposition of films 1, 2 and optionally separator 4, protection 3 and sampling scale 5. Consequently the robotisation of these operations is simplified and the robot to be developed is not of great complexity.

Results Obtained with the Kit

Figure 3B:
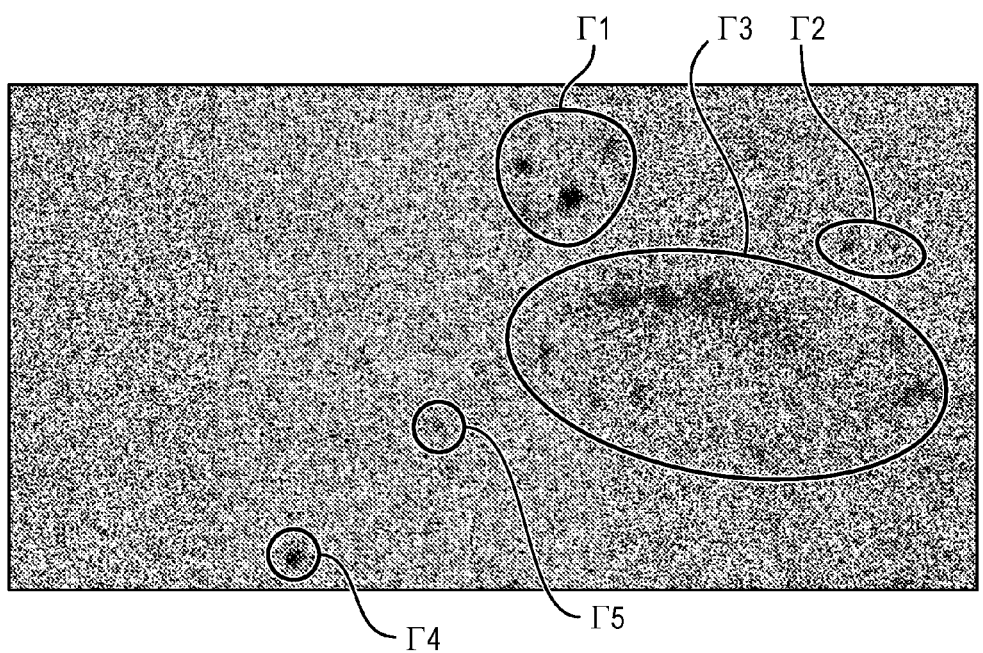
FIG. 3b is a reproduction of a second film developed by laser after exposure to the radiations of the solid surface, the film being the one farther away from the solid surface.

FIGS. 3a and 3b reproduce the markings of the first (FIG. 3a) and second (FIG. 3b) films 1 and 2 left by the $\beta^-$ and $\gamma$ radiations emitted by a solid surface that has been in contact with tritium $^3$H.

In FIG. 3a, 8 marked regions can be seen, they are referenced B1 to B3 and G1 to G5 on the first film 1.

In FIG. 3b, 5 marked regions can be seen, they are referenced Γ1 to Γ5 on the second film 2.

By comparing the two films 1 and 2, it can be noted that the regions G1 to G5 of the first film 1 correspond to the regions Γ1 to Γ5 of the second film 2. These five regions have therefore been marked by $\gamma$ radiations more penetrating than the $\beta^-$ radiations, which for their part have only marked the regions B1 to B3 of the first film 1. It is the absence of marking of the corresponding regions of the second film 2 that indicates the $\beta^-$ type of these radiations.

The areas of the solid surface corresponding to the areas B1 to B3 have therefore been contaminated by tritium $^3$H.

This demonstrates that the detection of the $\beta^-$ radiations (and indirectly of the atom nuclei responsible for these radiations) is simplified. In addition, this detection gives information on the tritium $^3$H contamination in two dimensions.

Figure 4A:
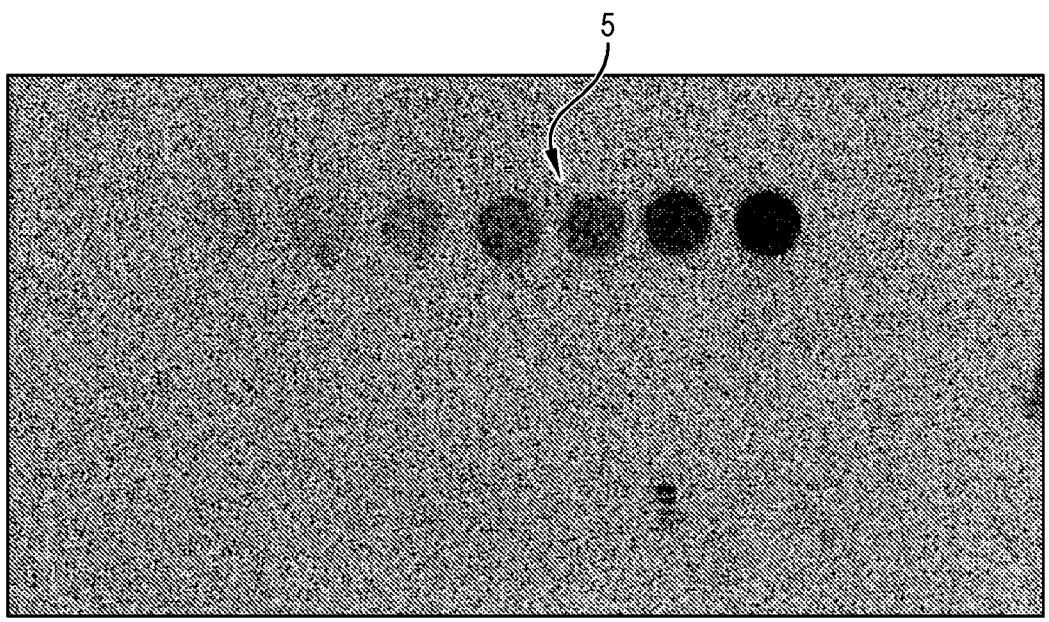
FIG. 4a illustrates the marking on a film due to a sampling scale for quantifying the $\beta^-$ and therefore tritium $^3H$ radiations obtained on a film of the same material as the first film in FIG. 1.

In order to be able to measure the $\beta^-$ radiations (and consequently tritium $^3$H) quantitatively, a sampling scale 5 is used as illustrated in FIG. 4a. It will be noted that the marking left by the sampling scale 5 is a succession of circles more or less intensely marked (dark). The closer the circle is to the colour of the rest of the film, the lower the concentration of tritium $^3$H. By comparing the result obtained for the first film 1 with this scale 5, it is possible to quantify the tritium $^3$H.

Figure 4B:
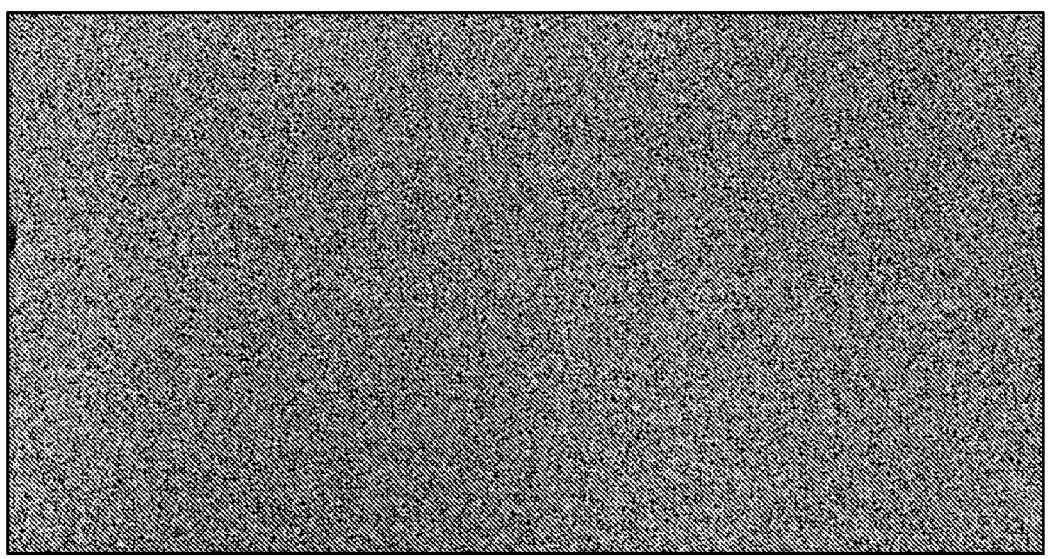

FIG. 4b shows a film placed in contact with the film of FIG. 4a. This film is not marked. Which shows clearly that the $\beta^-$ radiations can be characterised by the stacking of two films and are present at a point provided both that the first film 1 is marked and that the second film 2 is not marked.

The invention claimed is:

1. A method comprising:
   placing on a solid surface a first film or a superimposition of a number of films equal to or greater than two films, and wherein the first film or the films of the superimposition of films being sensitive to at least two distinct types of radiation including $\beta^-$ radiation;
   placing a second film directly onto the first film or the superimposition of films, wherein the second film being sensitive to at least two distinct types of radiation including $\beta^-$ radiation;
   waiting for a determined lapse of time;
   developing the films; and
   determining locations of the solid surface that are polluted by $\beta^-$ radiation emitting entities by identifying locations on the first film or a film of the superimposition of films positioned closest to the solid surface that correspond to $\beta^-$ radiation through a comparison of the first film or the film of the superimposition of films positioned closest to the solid surface to the second film after their development,
   wherein the number of films is determined so that no $\beta^-$ radiation reaches the second film.

2. The method of claim 1, wherein prior to waiting for the determined lapse of time, further comprising:
   covering the two films with a protection.

3. The method of claim 1 wherein the step of developing the films is carried out with a laser using suitable apparatus.

4. The method of claim 2, wherein the protection is a sheet of polymer film.

5. The method of claim 2, wherein the protection is a black fabric.

6. The method of claim 2, wherein the protection is a cover made from a material that cannot be penetrated by radiations to which the films are sensitive.

7. The method of claim 6, wherein the cover is made from lead.

8. The method of claim 1, wherein prior to waiting for the determined lapse of time, further comprising:
   placing a scale calibrated for quantifying $\beta^-$ radiation between the solid surface and the first film or the superimposition of films.

9. The method of claim 8, wherein after determining locations of the solid surface that are polluted by $\beta^-$ radiation emitting entities, further comprising:
   quantitatively measuring $\beta^-$ radiation emitted by $\beta^-$ radiation emitting entities.

10. The method of claim 1, wherein prior to placing the first film or the superimposition of films on the solid surface, further comprising:
    placing a separator directly in contact with the solid surface.

* * * * *